United States Patent [19]

Otten

[11] Patent Number: 4,599,492

[45] Date of Patent: Jul. 8, 1986

[54] COIN-TELEPHONE AUDITOR

[76] Inventor: David Otten, 58 Grove Hill Park, Newton, Mass. 02160

[21] Appl. No.: 567,041

[22] Filed: Dec. 27, 1983

[51] Int. Cl.$^4$ .......................................... H04M 17/02
[52] U.S. Cl. ........................... 179/6.3 R; 179/6.3 MA
[58] Field of Search ............ 179/6.3 R, 6.3 MA, 6.31, 179/6.4, 6.5, 2 A, 2 AM; 194/1 L, 1 M, 1 N, 11, 16; 340/870.02, 870.16

[56] References Cited

U.S. PATENT DOCUMENTS

| Re. 30,973 | 6/1982 | Zarouni . | |
|---|---|---|---|
| 3,588,357 | 6/1971 | Sellari . | |
| 3,925,619 | 12/1975 | Freethy . | |
| 4,039,768 | 8/1977 | O'Maley | 179/175.2 C |
| 4,041,243 | 8/1977 | Zarouni . | |
| 4,124,774 | 11/1978 | Zarouni . | |
| 4,124,775 | 11/1978 | Zarouni . | |
| 4,132,981 | 1/1979 | White . | |
| 4,206,321 | 6/1980 | McElliott | 179/6.3 R |
| 4,208,549 | 6/1980 | Polillo et al. . | |
| 4,262,264 | 4/1981 | Vandegraaf . | |
| 4,263,472 | 3/1981 | Juengel et al. . | |
| 4,263,482 | 4/1981 | Serres et al. . | |
| 4,352,104 | 9/1982 | Mizuta et al. . | |
| 4,486,625 | 12/1984 | Reinauer et al. | 179/2 A |
| 4,493,947 | 1/1985 | Loveless | 179/2 A |

FOREIGN PATENT DOCUMENTS 41457 12/1981 European Pat. Off. ......... 179/6.3 R

OTHER PUBLICATIONS

Klausen, Hans Peter, "Coin-Box Telephone", *Ericsson Review*, No. 2, Jun., 1983, pp. 73–79.

*Primary Examiner*—Gene Z. Rubinson
*Assistant Examiner*—Robert G. Lev
*Attorney, Agent, or Firm*—Cesari and McKenna

[57] ABSTRACT

An auditor system (10) includes a control circuit (30) that employs an off-hook detector (32) connected across the tip and ring lines (12 and 14) of a coin telephone to determine whether the coin telephone is off hook. It also employs a step-pulse detector (36) connected across the step relay terminals of the coin telephone, accept-pulse and reject-pulse detectors (40 and 42) connected across its accept/reject relay terminals, and a coin contact sensor (48) connected across its coin-contact terminals to keep track of the number of coins of each denomination accepted by the coin telephone. When the auditor system determines that the coin receptacle has collected a predetermined volume of coins, it connects a high-current power supply (18) across the tip and ring lines and thereby powers a transmitter (68) that sends dialing signals over the telephone lines to call up a data-collection computer at a remote location. Upon detecting, by means of a tone receiver (72), that the call has been answered, it employs the transmitter to send a request that the money in the coin telephone be collected. It also sends other information at the same time and receives information from the central computer for resetting some of its registers. Through the use of this type of auditor system, there is no need for the central computer to poll auditors at a number of coin-telephone locations, separate data lines are not needed, and the amount of communication over existing lines is kept to a minimum so that telephone traffic is not unduly increased.

7 Claims, 14 Drawing Figures

COIN-TELEPHONE AUDITOR

BACKGROUND OF THE INVENTION

The present invention is directed to coin-telephone auditors, which monitor the money collected by coin telephones so that the information can be obtained remotely.

Operation and maintenance of coin-operated telephones are quite expensive to the telephone operating companies. Among the many factors that contribute to this expense is simply the need to collect the money from the coin telephones. The cost of making collections differs from telephone to telephone since it can depend greatly on the telephone's location, but it has been estimated that the average cost of a single collection is on the order of ten dollars. Thus, any measures that can be taken to reduce the frequency with which the collections must be made can contribute significantly to the profitability of operating the coin telephone.

Of course, the cost of removing the receipts from a particular coin telephone can be reduced by reducing the collection frequency. But reducing collection frequency beyond a certain point results in lost receipts, since the telephone cannot be operated once the collection box is full. Furthermore, since the rate at which a given telephone becomes filled with coins can vary significantly from time to time, a time duration that is adequate between visits at one time may be too long at another time and may result in an unnecessary visit at a third time.

As a result, the use of auditors at coin-telephone locations has been proposed. Coin-telephone auditors keep track of the amount of money collected and send the collection information to a central location at which collections are scheduled. In some systems, equipment at a central location polls the remote auditors to determine whether the associated telephones need to be emptied. In other systems, the local coin-telephone auditor sends the information whenever a user places a call on the coin telephone.

There are many types of auditors, but all of them suffer from one or more of several drawbacks. Some, for instance, require extra communication lines to carry the information. Others increase the traffic on the normal telephone lines excessively because of the frequent polling needed to ensure that collections are kept current. Also, many auditors require power connections or substantial modifications of the coin telephone or of the central-office equipment so that the information can be recorded when a user makes a call.

It is accordingly an object of the present invention to provide the auditing function with local equipment that requires minimal modification of the coin telephone itself, requires no modification of central-office equipment, and can be operated by telephone-network power alone.

SUMMARY OF THE INVENTION

The foregoing and related objects are achieved in an auditor system that can be attached to existing coin-telephone terminals and includes a monitor that keeps track of the number of coins that the telephone has received. The auditor also has circuitry for dialing a telephone number that accesses central data-collection equipment. When the monitor determines that the coin amount has reached a predetermined level, it provides an appropriate indication to the dialing circuit, which calls the central data-collection location and transmits information indicating that the coin telephone is ready for a collection.

In this way, communication between the coin telephone and the central data-collection location can be limited to those occasions in which a collection is actually necessary. However, the same device can also be provided with means for notifying the central location immediately when a collection takes place and indicates the amount of money present at that time. This enables independent collectors to be billed accurately and reduces the likelihood of undetected embezzlement or theft.

As will be described below, such an auditor can be installed merely by connection to existing coin-telephone terminals, deriving its power from the telephone network.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
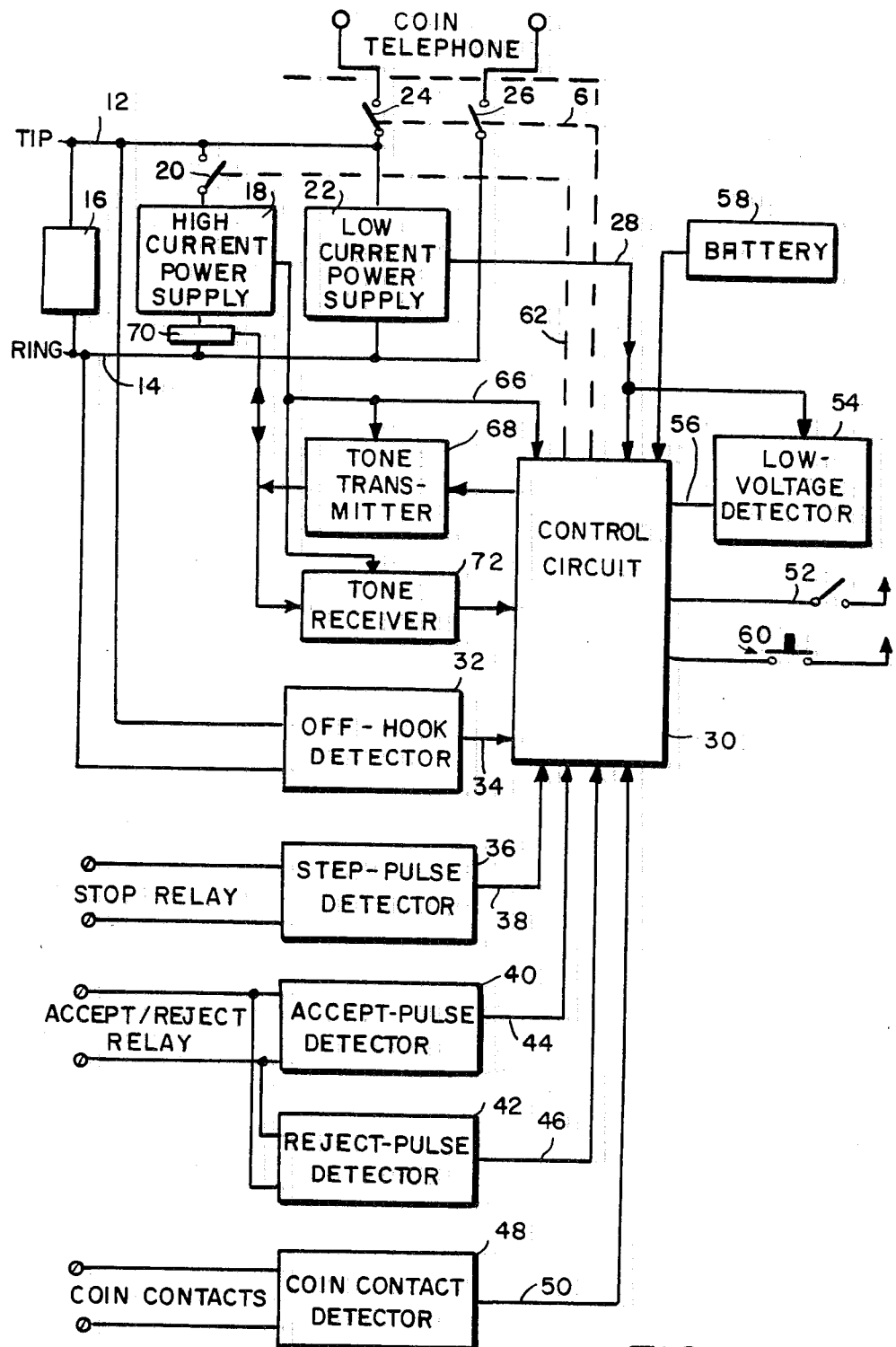
FIG. 1 is a block diagram of the auditor system of the present invention.

FIG. 1 shows in block-diagram form an auditor system 10 that can readily be installed in a coin telephone by connection to existing coin-telephone terminals without modification of any of the existing equipment. Electrical connections are made between the tip and ring lines 12 and 14, respectively, and a transient-protection circuit 16 is placed across the lines to prevent damage to the auditor 10 when voltage surges occur. When the auditor calls a central location to transmit its data, it employs a high-current power supply 18 that is connected for this purpose between tip and ring by relay contacts 20. Ordinarily, however, the high-current supply, which draws too much current to allow the telephone to appear to be in an on-hook condition, is kept disconnected from the tip line by open contacts 20. The power applied to the circuit then comes from a low-current supply 22, which is connected continuously across tip and ring and draws little enough current that the coin telephone appears to the central office to be in the on-hook condition. The auditor can thus take power exclusively from the telephone network without interfering with normal coin-telephone operation.

Tip and ring lines 12 and 14 are the lines by which the coin telephone ordinarily communicates with the central office, and relay contacts 24 and 26 provide the usual connection under control of the auditor.

The low-current supply 22 provides power, as line 28 indicates, to a microcomputer 30, which includes a microprocessor, memory, and various registers and interface circuitry necessary for carrying out its assigned tasks.

The control circuit 30 receives signals from various sensors, including an off-hook detector 32, which is connected across tip and ring and sends a signal over line 34 to the control circuit 30 to indicate whether or not the coin telephone is off hook. A step-pulse detector 36 is connected across the conventional step relay that a coin telephone ordinarily uses to indicate the value of coin that has been deposited. In most American telephones, for instance, the step relay sends a pulse for each five cents of value of the received coin. That is, it sends a single pulse when it receives a nickel, two pulses when it receives a dime, and five pulses when it receives a quarter. The step-pulse detector 36 sends this information over line 38 to the processor 30.

Also included in the coin telephone is an accept-/reject relay, which is operated in one direction to cause a received coin to enter the cash receptacle and operated in the other direction to reject the coin and send it to the coin return. Accept-pulse and reject-pulse detectors 40 and 42 are connected across this relay and notify the control circuit 30 by means of lines 44 and 46 when the accept/reject relay receives accept or reject pulses.

A coin-contact sensor 48 is connected across the coin contacts of the coin telephone to determine whether those contacts are open or closed. These contacts open once for each coin, and sensor 48 monitors the state of these contacts and sends the information to the control circuit 30 over line 50. By combining the information received from the step-pulse detector 36 and the contact sensor 48, the control circuit 30 can determine not only the monetary value and number of the coins received but also the number of coins of each denomination. A receptacle switch 52 provides further sensing. Switch 52 is a limit switch that engages the coin receptacle to indicate to the control circuit whether or not the receptacle is in place. A low-voltage detector 54 monitors the output of the low-current power supply 22 to notify the control circuit 30 over line 56 that the voltage output of low-current supply has fallen below a predetermined level. Such an occurrence may be caused, for instance, by an interruption of power on the telephone network. When it receives such a notification, the control circuit 30 switches into a mode in which it uses power from a long-lived battery 58 only to preserve the contents of the volatile elements of its memory.

The control circuit is also connected to receive signals from a test switch 60, which is typically used during installation of the auditor system into the coin telephone.

When the time comes for the control circuit to call the central office, it drives the relay containing contacts 20, as line 62 indicates, to connect the high-current supply 18 across tip and ring. When so connected, the high-current supply 18 applies power to the control circuit 30, as line 66 indicates, as well as to a tone transmission circuit 68, which is coupled by a coupler 70 through the high-current power supply 18 to the tip and ring lines 12 and 14 for transmission of the tones used in dialing. These tones are also used for transmission of data. A tone-reception circuit 72 is similarly coupled by coupler 70, receives information from the central data-collection location, and forwards the received information to the control circuit 30.

Figure 2A:
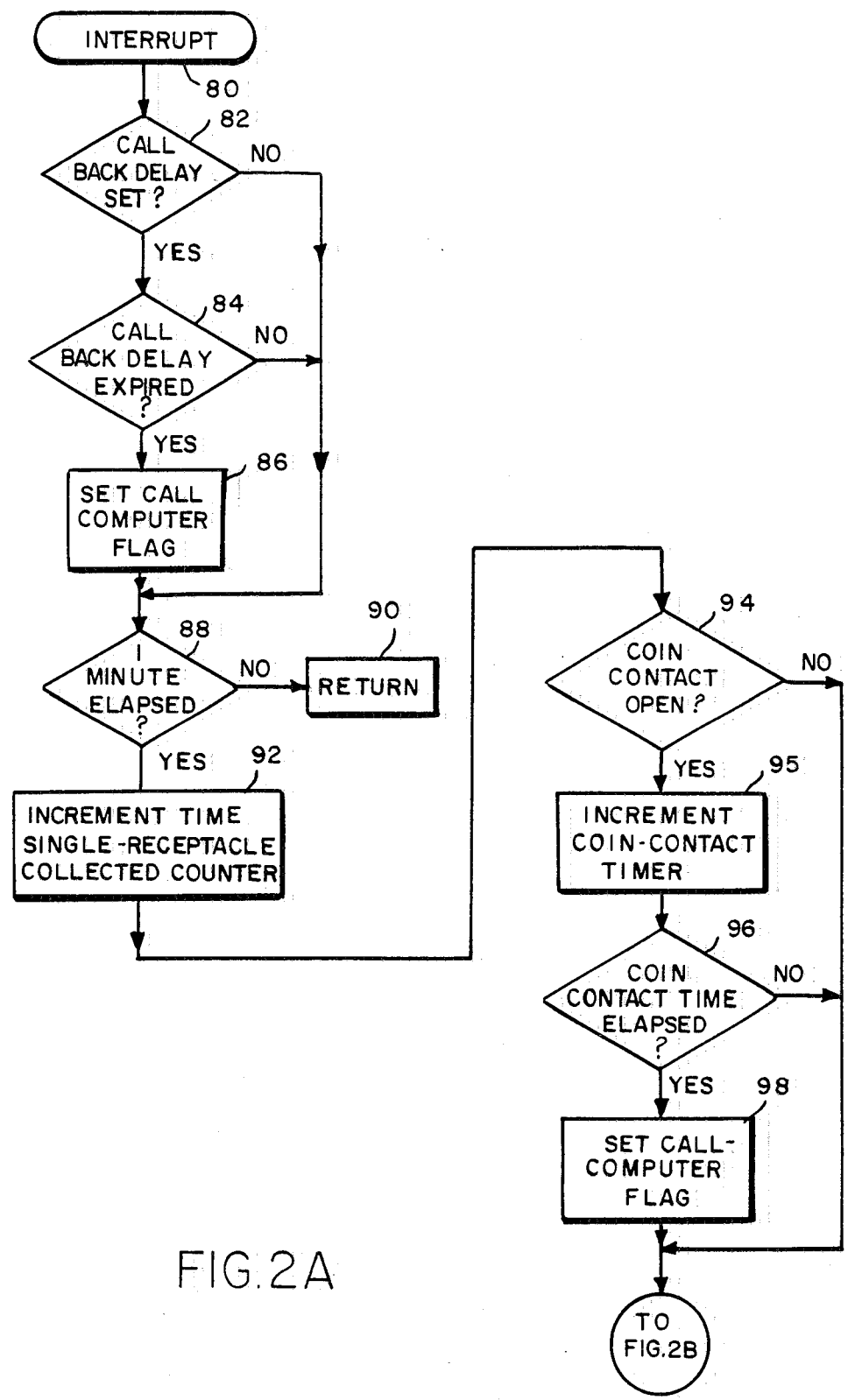
FIGS. 2-12 are flow charts representing the operation of the control circuitry employed in the system depicted in FIG. 1.
Figure 2B:
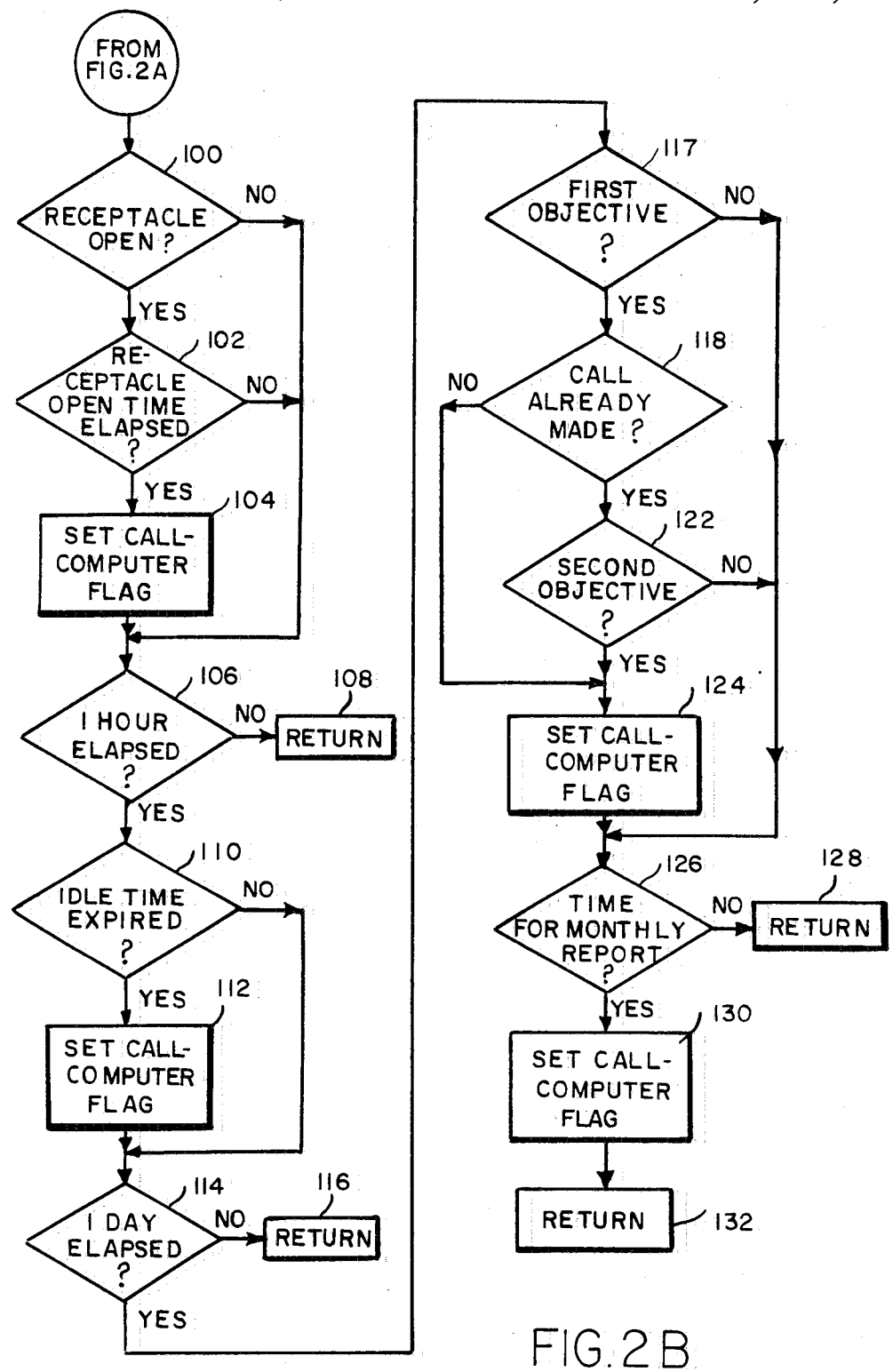

The control circuit 30 operates under a main program loop that continually monitors the inputs from its various sensors to keep memory locations and registers current with the information collected from the sensors. From time to time, this main loop is interrupted when a real-time clock times out. Such a clock may time out every half second, for example, and the control circuit then services the interrupt in accordance with an interrupt routine depicted in FIGS. 2A and 2B. When that interrupt occurs, as oval 80 indicates, the interrupt routine sets about determining whether one of several conditions exists that require the setting of a call-computer flag. A call-computer flag indicates to the main loop that a call to a computer at the central location should be initiated.

One condition that might require the control circuit to initiate a call is that a call had recently been attempted but not completed. Such a condition will be indicated by an appropriate register in the control circuit 30. The interrupt servicing routine tests this register, as block 82 indicates, and if a call has been attempted but not completed, the routine determines whether a predetermined delay time since the last attempt has expired. This determination is represented by block 84. If it has expired, then a call-computer flag is set, as block 86 indicates. If no unsuccessful call attempt has been made, or if one has been made but the predetermined delay since the previous attempt has not expired, then the flag is not set.

Whether the flag is set or not, the interrupt routine next determines whether it should enter part of the interrupt routine that is performed only once every minute. Block 88 representes this determination. If a minute has not elapsed, the interrupt routine simply returns control to the main loop, as block 90 indicates. If a minute has elapsed, however, the control circuit 30 increments a counter that keeps track of how much time has elapsed since the coin receptacle was last removed, as block 92 indicates.

The control circuit 30 next determines whether the coin contact of the coin telephone is open. The coin contacts open when a coin is dropped into the coin telephone. Other portions of the routine that are reached in connection with the main program loop employ the opening and closing of the coin contact to keep track of how many coins have been received by the coin telephone. In the interrupt-service routine of FIG. 2, however, a coin-contact timer is updated and checked to determine whether a coin is jammed in the telephone set. If a coin is jammed, the coin contacts will remain open. Accordingly, if the result of the test for a contact open represented by block 94 is affirmative, the coin-contact timer is incremented, as block 95 indicates, and the interrupt circuit then determines whether the contact has been open for too long a time. This test is represented by block 96 of the flow chart. If the coin contacts have been open for too long a time, the call-computer flag is set, as block 98 indicates. If the coin contact is not open, or if it has not been open for too long a time, then the call-computer flag is not set, and the routine proceeds to its next test, represented by block 100, in which the interrupt routine determines whether the coin-receptacle switch 52 is open.

If the coin-receptacle switch 52 is open, the routine performs a test, represented by block 102, to determine whether it has been open for too long a time. If it has been open for a longer time than is required for ordinary collection activities, then it is likely that the telephone has been tampered with, and investigation is required. The result therefore is that the call-computer flag is set, as block 104 indicates. If the receptacle is not open, or if it has not been open for too long a time, then the call-computer flag is not set.

Whether that flag is set or not, the interrupt routine then proceeds to a determination of whether or not to proceed to a portion of the interrupt routine that is only reached once every hour. This determination is represented by block 106, in which the routine determines whether one hour has elapsed since the last time the control circuit 30 performed this part of the interrupt routine. If an hour has not elapsed, the interrupt routine returns control to the main loop of the program, as block 108 indicates.

If an hour has elapsed, a test is made, as block 110 indicates, to determine whether the coin telephone has been idle for more than a predetermined length of time. This predetermined length of time can be set from the remote location to which the auditor system 10 sends its data, and so the idle time can be varied to accommodate to changing circumstances. Idleness of a telephone for more than a particular length of time is an indication that something untoward has occurred and investigation is warranted. Accordingly, if the idle time has expired, the call-coxputer flag is set, as block 112 indicates. If that time has not expired, then the call-computer flag is not set. In either event, the routine proceeds to a determination, represented by block 114, of whether a day has elapsed since the control circuit performed the remainder of the interrupt-service routine.

If a day has not elapsed, then the interrupt routine returns control to the main loop of the program, as block 116 indicates. Otherwise, the interrupt routine determines whether enough coins have been deposited to justify requesting that a collection be made. The real-time clock in the control circuit 30 is set so that the result of the test represented by block 114 is affirmative at a low-activity time, typically some time after midnight, when the activity of the auditor system in calling the remote data-collection station is least likely to interrupt normal coin-telephone use. In order to insure that the time of day at which the auditor system 10 reports does not drift over time into a high-activity time of day, the clock by which the control circuit 30 determines when a day has elapsed can advantageously be arranged to be reset in response to information sent by the computer during a collection-request call.

If the time that is appropriate for routine calls has been reached, the control circuit then determines whether a call is justified by the volume of coins contained in the coin receptacle. It does this by computing the volume of coins in nickel-equivalent volumes. In the illustrated example, the nickel-equivalent volume is derived by adding to the number of nickels one-half of the number of dimes and five-fourths of the number of quarters. This nickel-equivalent volume is then compared with two different coin-volume objectives.

The first objective is a level that is low enough to give the central computer a predetermined number of days of advance notice that a collection will be needed. The predetermined number of days is stored in a register in the control circuit 30 and can be reset in response to information received during a call to the central computer. The control circuit computes the first objective by first calculating the average volume of coins received per day since the last collection and then extrapolating from this average the number of days that it will take to fill the coin receptacle to a target level. If the projected number of days is equal to or less than the number of days of advance notice that is stored in control circuit 30, the control circuit determines that a call to the central computer should be made. This determination is represented in FIG. 2 by block 117.

If the result of this determination is affirmative, then the control circuit 30 proceeds to determine whether the central computer was called to request a collection on a previous night. This test is represented by block 118 of FIG. 2. If the central computer has not yet been called, then the program proceeds to block 124, in which it sets the call-computer flag.

If the central computer has been called on a previous night, on the other hand—i.e., if the result of test 118 is affirmative—the interrupt routine will proceed to a test represented by block 122, in which the control circuit 30 determines whether the coin volume has reached the second, higher objective level, at which the receptacle is considered to be full or nearly full. If this second objective has been reached, then the call flag is set even if a call to the central computer requesting a collection was made the night before. If, for instance, a call was made the night before in response to reaching the first objective, for which test 117 was made, the information in the computer would indicate that collection could comfortably be made within, say, four days. If an unusually high cash-call traffic occurred in the interim, however, the coin receptacle could be much fuller than projected—i.e., its coin volume could reach the second objective—and the central computer would be notified of this fact.

If neither of the objectives is met, or if only the first objective is met and a call has already been made, the call-computer flag is not set, and the routine proceeds to a test represented by block 126.

In this test, the control circuit 30 determines whether the time has arrived for a monthly report to be made to the central data-collection location. If it has not, the interrupt-service routine returns control to the main computer loop, as block 128 indicates. If it has, the call-computer flag is set, as block 130 indicates, and control is returned to the main loop, as block 132 indicates. This completes the interrupt-service routine.

Figure 3:
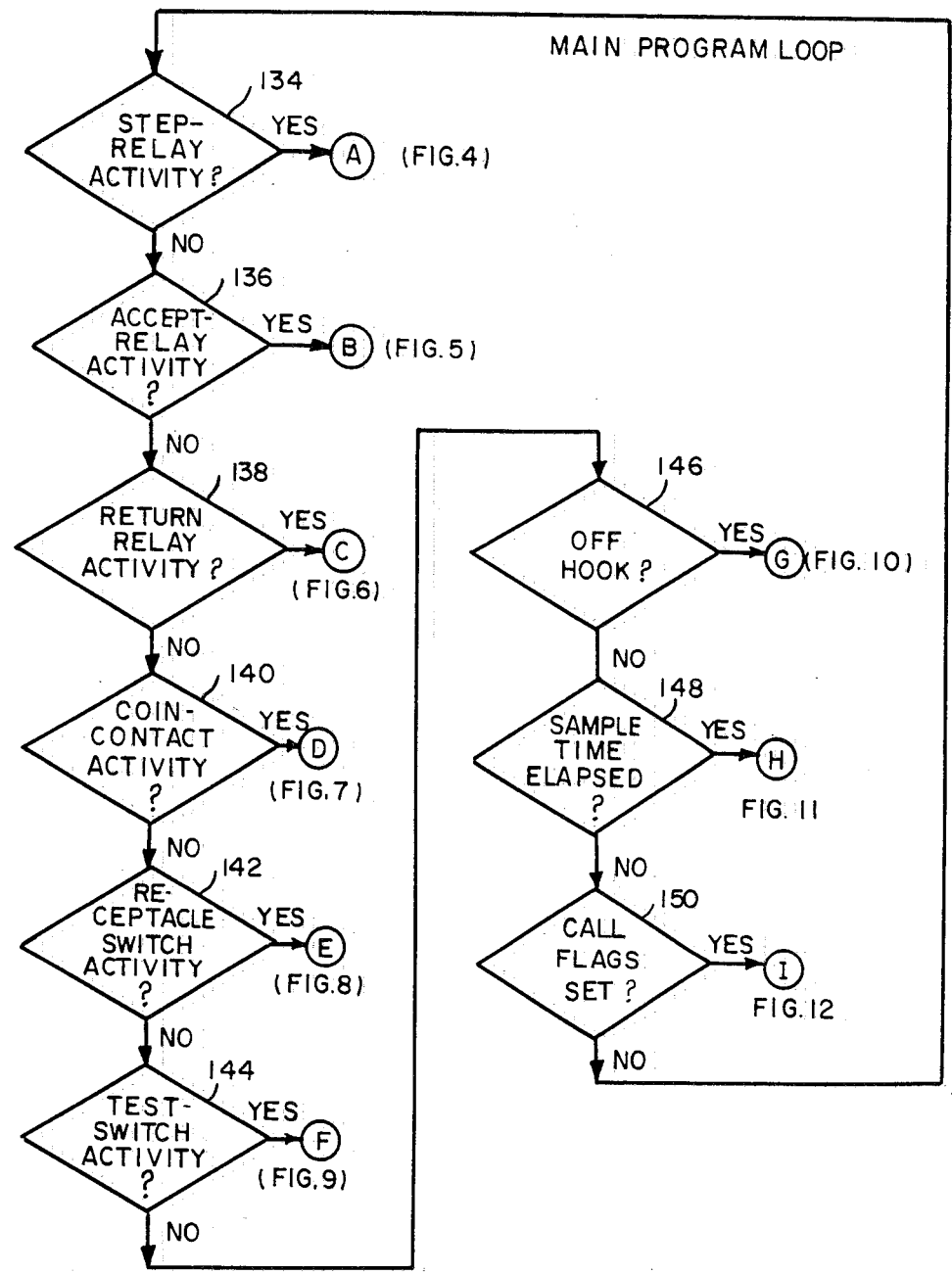

The main program loop mentioned above is depicted in FIG. 3. In this loop, the control circuit 30 repeatedly checks for activity in its various inputs. Block 134 of FIG. 3 represents a determination of whether or not activity has been detected in the step relay of the coin telephone. This is the relay that produces output pulses representing the monetary value of the deposited coin. The determination represented by block 134, like several of the other determinations described below, includes a provision for eliminating erroneous results due to contact bouncing. For instance, several samples in a row may be taken of the output of the step-pulse detector 36, and a determination that a state has changed will only be made if several samples in a row indicate the same changed state. If the determination represented by block 134 is affirmative, then control is passed to a subroutine for reacting to step-relay activity. This subroutine will be described below in connection with FIG. 4.

If the determination made by test 134 is negative, the main program loop proceeds to a test represented by block 136, which is a determination of whether activity in the accept/reject relay has been detected by the accept-pulse detector 40. If so, control is passed to a subroutine depicted in FIG. 5 and described below in connection with that figure. If no relay activity has been detected by the accept-pulse detector 40, then a determination is made, as represented by block 138, of whether the reject-pulse detector 42 has detected activity in the accept/reject relay. If so, appropriate action is taken by a subroutine depicted in FIG. 6. Otherwise, the main program loop continues to the next test, represented by block 140, in which a determination is made of whether the coin-contact detector 48 has detected any activity. If so, the main program loop branches to a subroutine depicted in FIG. 7. Otherwise, the main loop continues to a test represented by block 142, in which a determination is made of whether the receptacle switch 52 has changed state. If so, the program branches to the subroutine depicted in FIG. 8.

Figure 9:
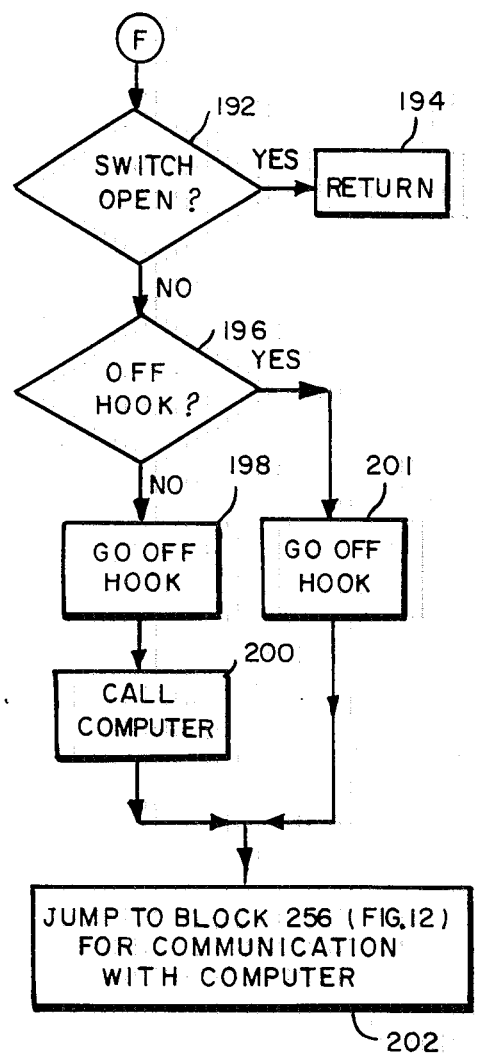
Figure 10:
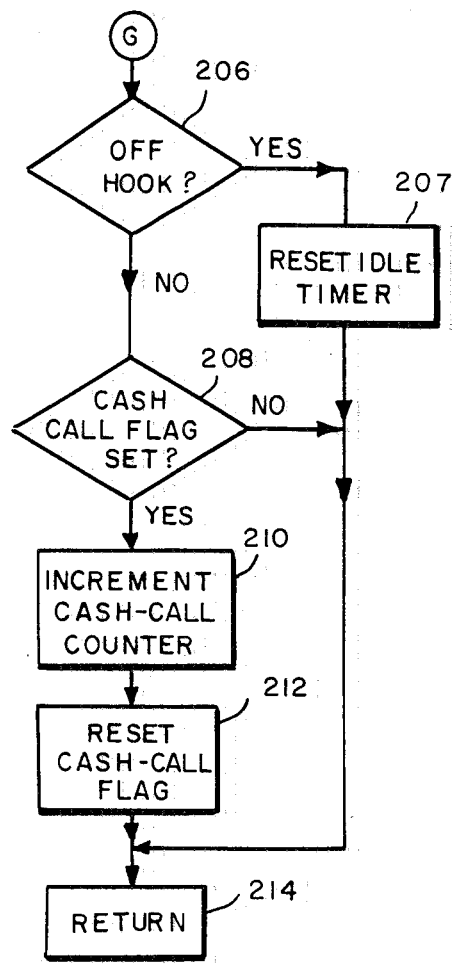

To provide for installation and maintenance, the main program loop also determines whether the test switch has changed state, as block 144 indicates. The subroutine for responding to such activity is depicted in FIG. 9. Block 146 represents a test that is then made to determine whether a change has occurred in the output of the off-hook detector 32. If so, a subroutine depicted in FIG. 10 is executed. This subroutine updates a cash-call count if necessary. If a change has not occurred in the off-hook-detector output, the main program loop proceeds to a step represented by block 148, in which the program determines whether or not coins should be counted. If so, the main loop tranfers control to a coin-counting subroutine depicted in FIG. 11. More specifically, block 148 represents the step of determining whether there has been a step-relay output since the last performance of the counting subroutine of FIG. 11 and, if so, whether enough time has elapsed since the most recent pulse from the step relay to indicate that the step-relay count for a given coin has been completed. If so, the counting operation is performed.

The main program loop next performs a test represented by block 150 of FIG. 3. In this test, the main program loop determines whether any of the subroutines or the interrupt-service routine has caused a call-computer flag to be sent. If so, control passes to a subroutine depicted in FIG. 12. Once the test represented by block 150 and, if necessary, the subroutine of FIG. 12 have been completed, the main program loop returns to the test represented by block 134, and the sequence repeats.

Figures 4, 5:
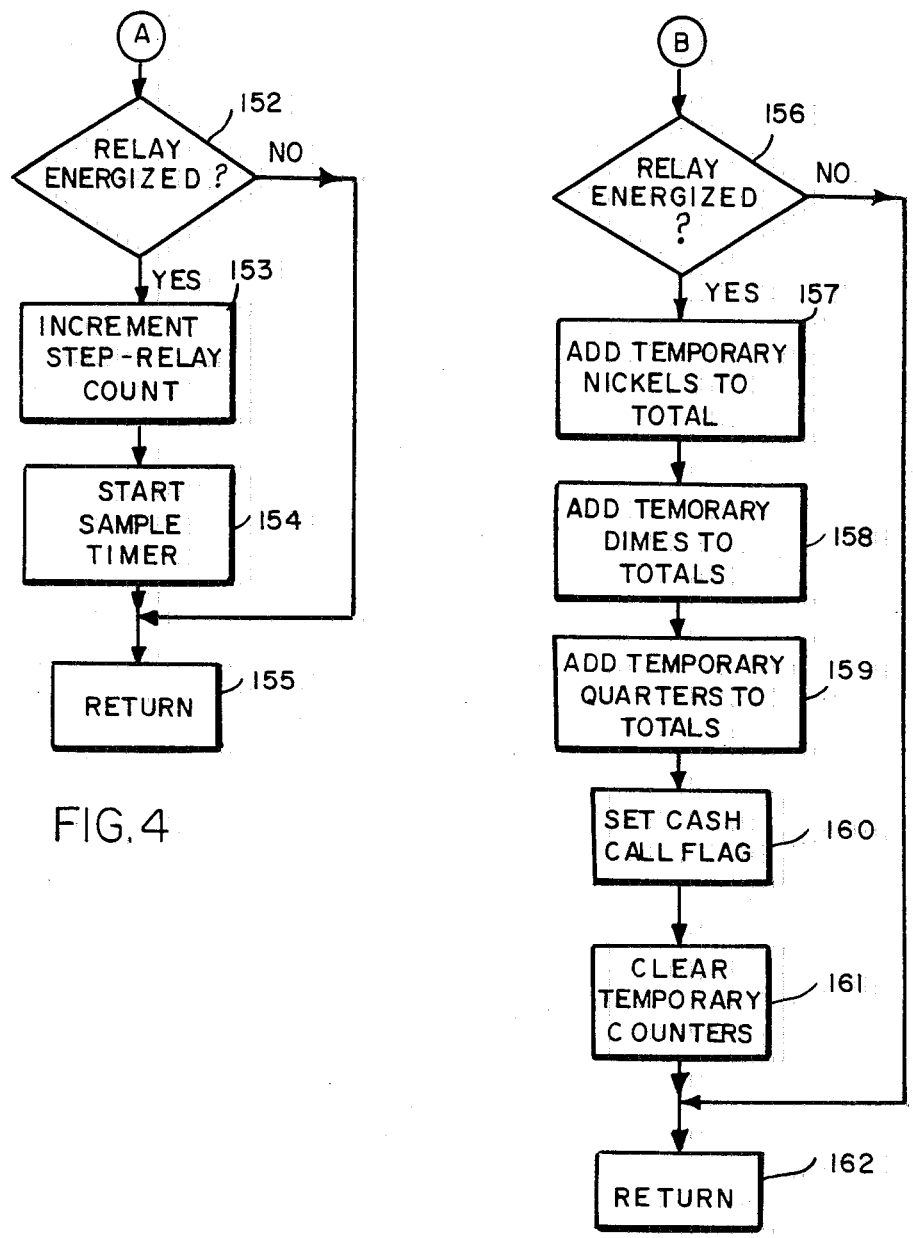

As was mentioned above, if the result of the test represented by block 134 is positive, the output of the step relay has changed, and the control circuit 30 enters a subroutine depicted in FIG. 4. In FIG. 4, the first block 152 represents a determination of whether the change of state has been to an energized or a deenergized state. If the relay has changed to an energized state, it is signaling that an additional five cents' worth of coins has been received. The program responds to this signal by incrementing a step-relay count, as block 153 indicates. It then proceeds to start a sample timer, as block 154 indicates. This sample timer is the one mentioned in connection with the test represented by block 148 of FIG. 3 to determine whether the step relay has completed sending the pulses for the coins that it has received so far. After this test is completed, control is returned to the main loop, as block 155 indicates. Also, if the test indicated by block 152 is negative—that is, if the step relay had changed to a de-energized state rather than an energized state—control is similarly returned to the main loop to perform the test represented by block 136.

If the test represented by block 136 of FIG. 3 is positive, indicating that there has been a change of state in the output of the accept-pulse detector 40 of FIG. 1, the control circuit 30 determines whether the change has been to a state indicating that the accept/reject relay has operated to accept the deposited coins. That is, it determines whether the coin telephone has operated to drop the coins into its coin receptacle so that they can no longer be returned by way of its coin return. This determination is represented by block 156 of FIG. 5.

By way of subroutines described below, the control circuit 30 counts the number of each type of coin when coins are deposited, but it does not add the deposited coins to its totals unless the telephone accepts the coins. Once the test 156 has resulted in an affirmative determination, indicating that the telephone has accepted the coins, the subroutine of FIG. 5 proceeds through the steps represented by blocks 157, 158, and 159, in which the numbers of coins temporarily stored are added to registers carrying the total of accepted coins accumulated since the last collection. The subroutine of FIG. 5 then proceeds to a step represented by block 160, in which it sets a flag to indicate that a cash call is in progress. This flag is used in later operations to keep a total of the number of cash calls that have been made from the coin telephone. The subroutine then proceeds to a step represented by block 161, in which the temporary counters are cleared. Control is then returned to the main program loop, as block 162 indicates, and the test represented by block 138 of FIG. 3 is performed.

Figure 6:
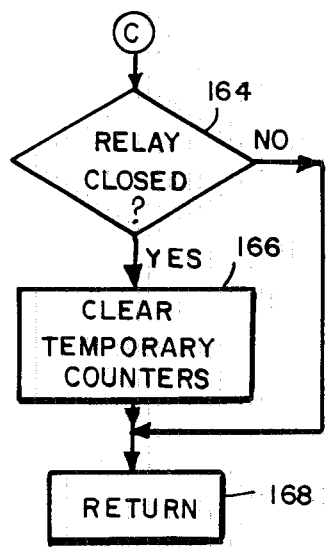
Figure 7:
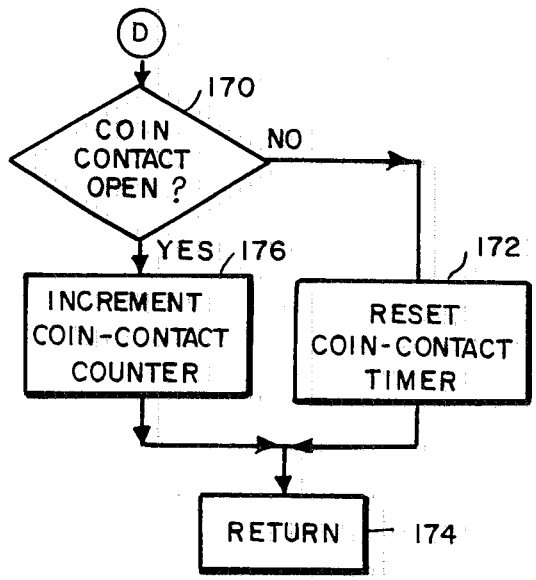

If the test represented by block 138 is affirmative, indicating that the output of reject-pulse detector 42 of FIG. 1 has changed, the main program loop branches to the subroutine depicted in FIG. 6. This routine first determines whether the state of the output of detector 42 has changed to one that indicates that the accept-/reject relay has been energized to the reject position. If so, the subroutine of FIG. 6 proceeds to a step represented by block 166, in which the counters are cleared that contained the numbers of coins temporarily until it was determined whether or not the coins would be accepted. Control is then returned to the main loop, as block 168 indicates. Control is similarly returned to the main loop if the result of the test represented by block 164 is negative.

In the main loop, the control circuit 30 performs the test represented by block 140 of FIG. 3. A positive result of this test indicates that there has been a change in the state of the coin-contact sensor 48 of FIG. 1, which senses the state of coin contacts that open momentarily when a coin is deposited. In response to this affirmative determination, the main loop branches to the subroutine depicted in FIG. 7. In this subroutine, the control circuit 30 initially determines the state to which the coin contacts have changed, as block 170 indicates. If the contacts have closed, the subroutine performs a step represented by block 172. This step resets the timer that is consulted in the test represented by block 96 of FIG. 2. As was stated above, that timer indicates how long the contacts have been open and it is incremented once each minute as long as the contacts remain open. In the step of block 172, the coin-contact timer is reset when the coin contacts close, and operation of the main program loop then resumes, as block 174 indicates.

If the result of the test represented by block 170 is affirmative, on the other hand, indicating that the coin contacts have just opened, the control circuit 30 increments a coin-contact counter, which keeps track of the number of coins, regardless of denomination, that have been received since the last accept or reject pulse. This step is represented by block 176. The information contained in the coin-contact counter is subsequently combined with the information derived from the step relay to determine the numbers of different types of coins that have been received.

After the coin-contact counter is incremented, control returns to the main loop of FIG. 3, which proceeds to the test represented by block 142. An affirmative result of the test of block 142 indicates that the receptacle switch 52 of FIG. 1 has just been opened or closed. In response to this activity, the main loop of FIG. 3 branches to the subroutine depicted in FIG. 8. This subroutine begins with a test represented by block 178 of FIG. 8, which determines whether the change of state is to one indicating that the receptacle switch 52 is open. If the switch is closed, the timer that is consulted in the test represented by block 102 of FIG. 2 is reset, as block 179 indicates, and control is returned to the main loop. If switch 52 is open, then the cash receptacle has been removed, and the control circuit 30 proceeds to determine whether or not a previous removal of the cash receptacle occurred recently, as block 180 indicates. If it did, the control circuit 30 infers that the opening of the receptacle switch 52 is merely the result of jiggling the coin receptacle pursuant to a removal to which the control circuit 30 has already responded or pursuant to the accompanying replacement of the coin receptacle. Accordingly, if the coin receptacle has recently been removed, the subroutine of FIG. 8 returns control to the main loop.

If a previous opening of the receptacle switch 52 has not occurred recently, the program proceeds to a step represented by block 182, in which a count of receptacle removals—and presumably of cash collections—is incremented. Also, as block 184 indicates, the control circuit 30 resets a counter that keeps track of how long it has been since cash was collected from the coin telephone.

Figure 8:
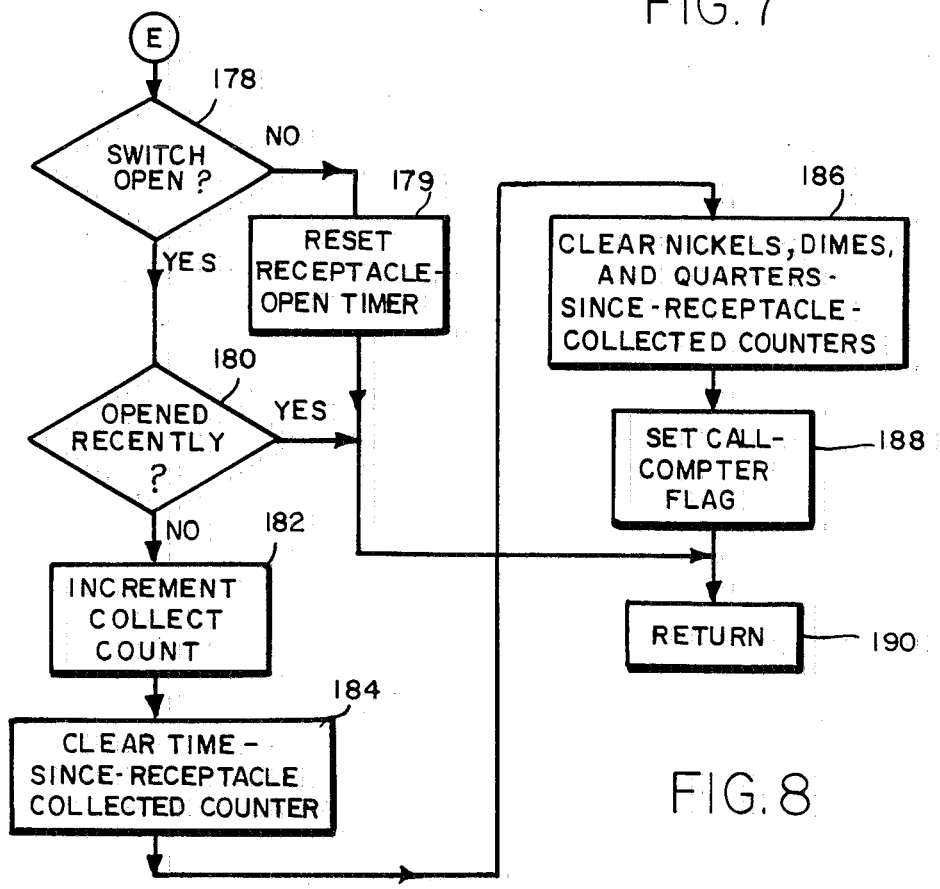

In a step represented by block 186 of FIG. 8, the control circuit 30 clears counters that keep track of how many coins of each denomination have been collected since the last time the coin receptacle was emptied, and a call-computer flag is set, as block 188 indicates. The result is that the control circuit 30 places a call to the computer at the central data-collection location as soon as a collection is made; i.e., the control circuit 30 does not wait until nighttime to place the call. Control is then returned to the main loop, as block 190 indicates, and control circuit 30 performs the test represented by block 144 of FIG. 3.

If the test switch 60 of FIG. 1 opens or closes, the test represented by block 144 yields an affirmative result, and control as a consequence is transferred to the subroutine depicted in FIG. 9.

The first step in the subroutine depicted in FIG. 9 is a determination of whether the test switch 60 has opened or closed. This is a switch that is used during installation by an installer to test the circuit or obtain certain initial information. The installer may call the central computer by dialing its number from the coin-telephone dial and then closing the test switch to cause it to be receptive to information transmitted from the central computer. In the alternative, the installer may close the switch without first calling the central computer. In such a circumstance, the auditor is intended to place a call on its own so that the installer can determine whether the auditor system 10 operates correctly to call the central computer.

Accordingly, the subroutine of FIG. 9 first performs the test represented by block 192, in which the control circuit 30 determines whether the activity detected in the main loop was a switch opening rather than a switch closure. If it was not a switch closure, the subroutine merely returns control to the main loop, as block 194 indicates.

If the activity was a switch closure, on the other hand, the subroutine of FIG. 9 proceeds to the step represented by block 196, in which the control circuit determines whether the line is in an off-hook condition. If not, then the installer has not first dialed the central computer, and he expects the control circuit 30 to do so. Accordingly, the control circuit activates the high-current power supply to go off hook, as block 198 indicates. It also operates the tone transmitter, as block 200 indicates, to call the central computer.

If the result of the test represented by block 196 is a determination that the lines were already in an off-hook state, the control circuit 30 infers that the installer has already called the central computer. As it does when the central computer has not been called, the control circuit 30 operates the high-current power supply so that it can operate the tone receiver, as block 201 indicates. However, there is no need to call the computer. Regardless of whether the call to the computer is dialed by the installer or by the control circuit, the control circuit then enters a routine for communication with the central computer, as block 202 indicates. This routine is described below in connection with FIG. 12.

An affirmative result of the test represented by block 146 of FIG. 3 indicates that there has been a change in the output of the off-hook detector 32. In response to such a change, the control circuit 30 enters the subroutine depicted in FIG. 10. Block 206 of FIG. 10 represents its initial test, which is a determination of whether the transition has been from an on-hook to an off-hook condition. If it has, the telephone is no longer idle, so the program resets the timer that is consulted in the test represented by block 110 of FIG. 2. This step is represented by block 207. The program then returns to the main loop.

If the telephone has just returned to its on-hook condition, the subroutine determines whether the cash-call flag has been set, as block 208 indicates. The cash-call flag is the flag that is set in the step represented by block 160 of FIG. 5 to indicate that the coin telephone has accepted the deposited coins. If this flag has not been set, the subroutine of FIG. 10 returns control to the main loop of FIG. 3. Otherwise, it increments a cash-call counter, as block 210 indicates, and resets the cash-call flag, as block 212 indicates. The control circuit 30 thus keeps track of how many cash calls have been made by incrementing the cash-call counter when acceptance of coins is followed by a change to an on-hook condition.

After it resets the cash-call flag, the subroutine of FIG. 10 returns control to the main program loop, as block 214 indicates.

As was discussed in connection with FIG. 4, the control circuit 30 counts pulses from the step-pulse detector 36 to determine the monetary value, in terms of nickel equivalents, of the coins that have been received. Further, it operates a timer to keep track of how long it has been since the step relay produced its last pulse. If the time since the last pulse is greater than a predetermined maximum, the control circuit 30 infers that the step relay has concluded sending pulses representing the number of nickel equivalents that it has mechanically stored. As was also indicated above, step 148 of the main loop determines whether or not this maximum time has been completed. If it has, control is passed to the subroutine depicted in FIG. 11. The purpose of the subroutine of FIG. 11 is to derive the number of coins of each denomination from the numbers of step-relay pulses and coin-contact pulses that it has received.

Figure 11:
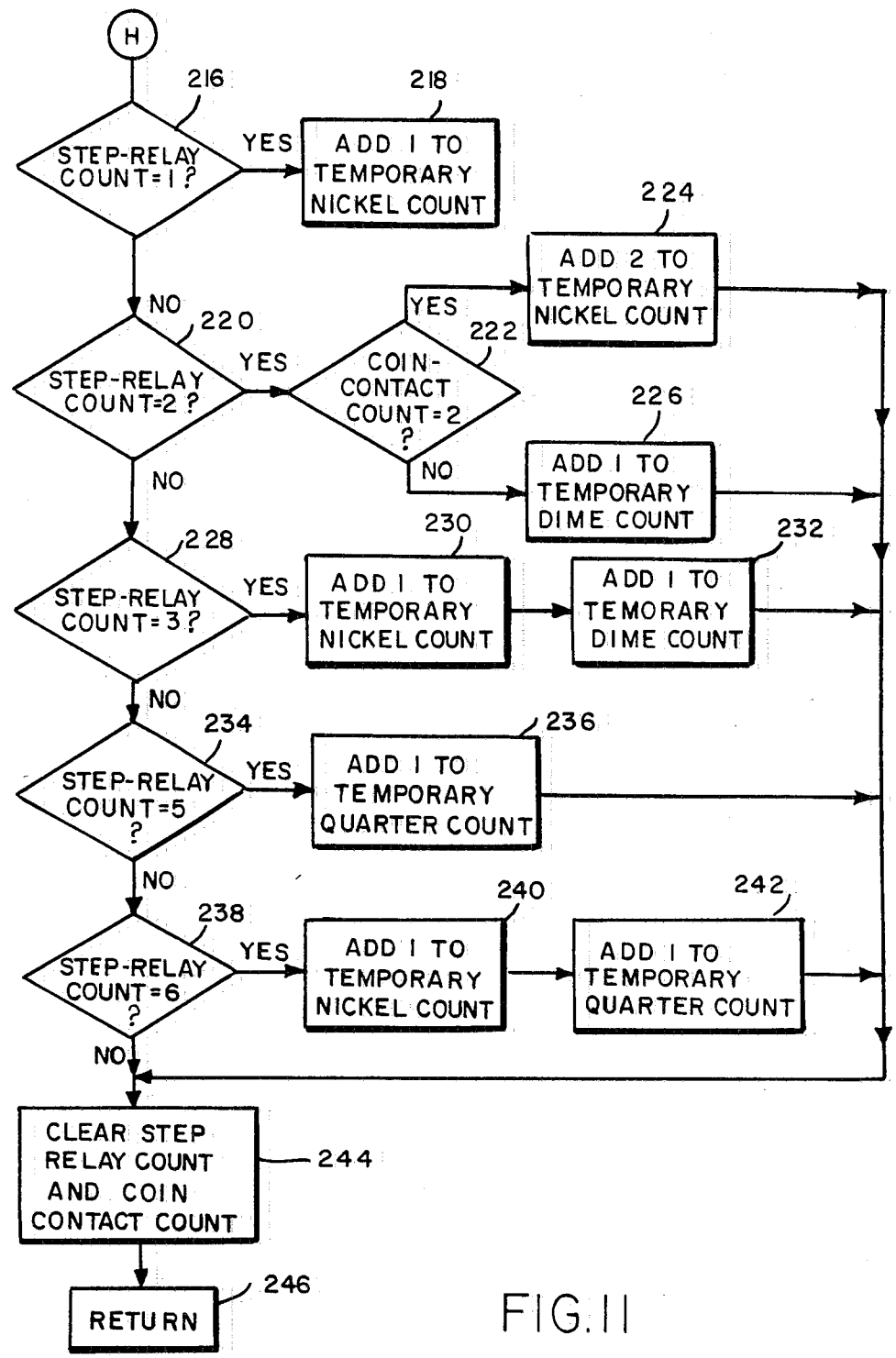

In order to understand the function performed by the subroutine in FIG. 11, it is necessary first to understand the manner in which the coin telephone responds when coins are deposited. When a coin is dropped from a coin slot, the coin contacts whose state is sensed by the coin-contact detector 48 open momentarily and then close. At the same time, a mechanical device within the coin telephone is rotated a distance that is proportional to the monetary value of the deposited coin and this causes the step relay to emit a number of pulses that represent this monetary value. That is, the step relay emits one pulse for a nickel, two pulses for a dime, and five pulses for a quarter.

In some coin telephones, however, the step relay does not emit pulses until enough money has been inserted to pay the minimum cost of a telephone call, typically ten cents. If the user inserts a nickel initially, for instance, the mechanical memory device is rotated a single position, but this rotation is not followed by a pulse transmission, because the minimum cost has not been met. If the user then deposits another nickel, the coin contacts will again open, indicating the receipt of a second coin, and the mechanical memory device will advance another position. This time, however, the minimum cost has been reached, and the step relay responds by sending two pulses to indicate that it has stored a monetary value equal to two nickels. If the second coin had been a quarter instead of a nickel, the mechanical memory device would have advanced five positions farther, and the step relay would then have sent six pulses to represent an accumulated dollar value of thirty cents. The six pulses are sent one after the other without a delay that is greater than the sample time for which the step represented by block 148 of FIG. 3 tests. In situations in which the minimum cost has already been met, on the other hand, the pulses sent by the step relay in response to one coin are typically separated from those sent in response to another by a length of time that is greater than the sample time.

With this operation in mind, it is possible to appreciate the operation of the subroutine depicted in FIG. 11. This subroutine is entered when the sample time is exceeded—i.e., when transmission of all the pulses representing the mechanically stored monetary value is completed. A test step represented by block 216 determines whether the step-relay count is only one. If it is, the received coin has to have been a nickel, and the temporary nickel count is incremented, as block 218 indicates. An affirmative result of the test represented by block 216 can occur if a single nickel is deposited in a coin telephone in which the minimum cost has already been met.

If the result of the test represented by block 216 is negative, the subroutine proceeds to a further test, represented by block 220, in which it determines whether the number of pulses from the step relay equals two. If it does, there are two possibilities. The first is that a single dime has been deposited. The second is that a nickel was deposited initially but a corresponding pulse from the step relay was not sent until a second nickel was deposited to reach the minimum cost and thus activate the step relay, which accordingly generated two pulses, one for each of the deposited nickels. To determine which of the two possibilities is correct, the routine proceeds to a test represented by block 222, in which the number of openings of the coin contacts is checked. If the number is equal to two, then two nickels have been deposited, and the temporary nickel count is incremented by two, as block 224 indicates. Otherwise, the two step-relay pulses were caused by a single dime, and a temporary dime count is incremented, as block 226 indicates.

If the step-relay count is neither one nor two, the subroutine depicted in FIG. 11 next determines whether the count is three. For the types of coin telephones contemplated by the illustrated embodiment of the present invention, there is only one possible explanation for a step-relay count of three, namely, that a nickel and then a dime were deposited. Accordingly, as blocks 230 and 232 indicate, the temporary nickel and temporary dime counts are both incremented by one.

If the step-relay count is neither one, two, nor three, the subroutine of FIG. 11 next determines whether the step-relay count is five, as block 234 indicates. The subroutine does not determine whether the step-relay count is four, because, for the coin telephones contemplated by the illustrated embodiment, there is no possibility that the step-relay count is four. The reason is that there is neither a single American coin that is equal in value to four nickels nor one whose value when added to that of an initially deposited nickel equals that of four nickels.

The only combination of one or two coins whose value is equal to that of five nickels is a single quarter, so the temporary quarter count is incremented by one, as block 236 indicates, if the result of the determination represented by block 234 is affirmative.

Finally, if the step-relay count is not one, two, three, or five, a test is performed, as block 238 indicates, to determine whether the step-relay count is equal to six. If it is, then the count has been caused by a nickel and a quarter, so the temporary nickel and temporary quarter counts are both incremented by one, as blocks 240 and 242 indicate.

When any of the temporary-count incrementations represented by blocks 218, 224, 226, 232, 236, and 242 is completed, the subroutine of FIG. 11 proceeds to the step represented by block 244, in which the step-relay count and coin-contact count are cleared to be ready to count the next coin or coins that are deposited. The block diagram of FIG. 11 also indicates that the step represented by block 244 follows the test represented by block 238 if the outcome of that test is negative. Provision for a negative outcome of the block 138 determination is provided for those instances in which a coin-telephone malfunction or actions of service personnel cause abnormal counts in the step-relay and coin-control counters. These abnormal counts are ignored. In the absence of an error or malfunction, though, the outcome of this test will never be negative, because the tests represented by the test blocks of FIG. 11 cover all of the ordinarily possible numbers of relay pulses.

Once the step-relay and coin-contact counts have been reset, the subroutine of FIG. 11 returns control to the main program loop, as block 246 indicates.

Figure 12:
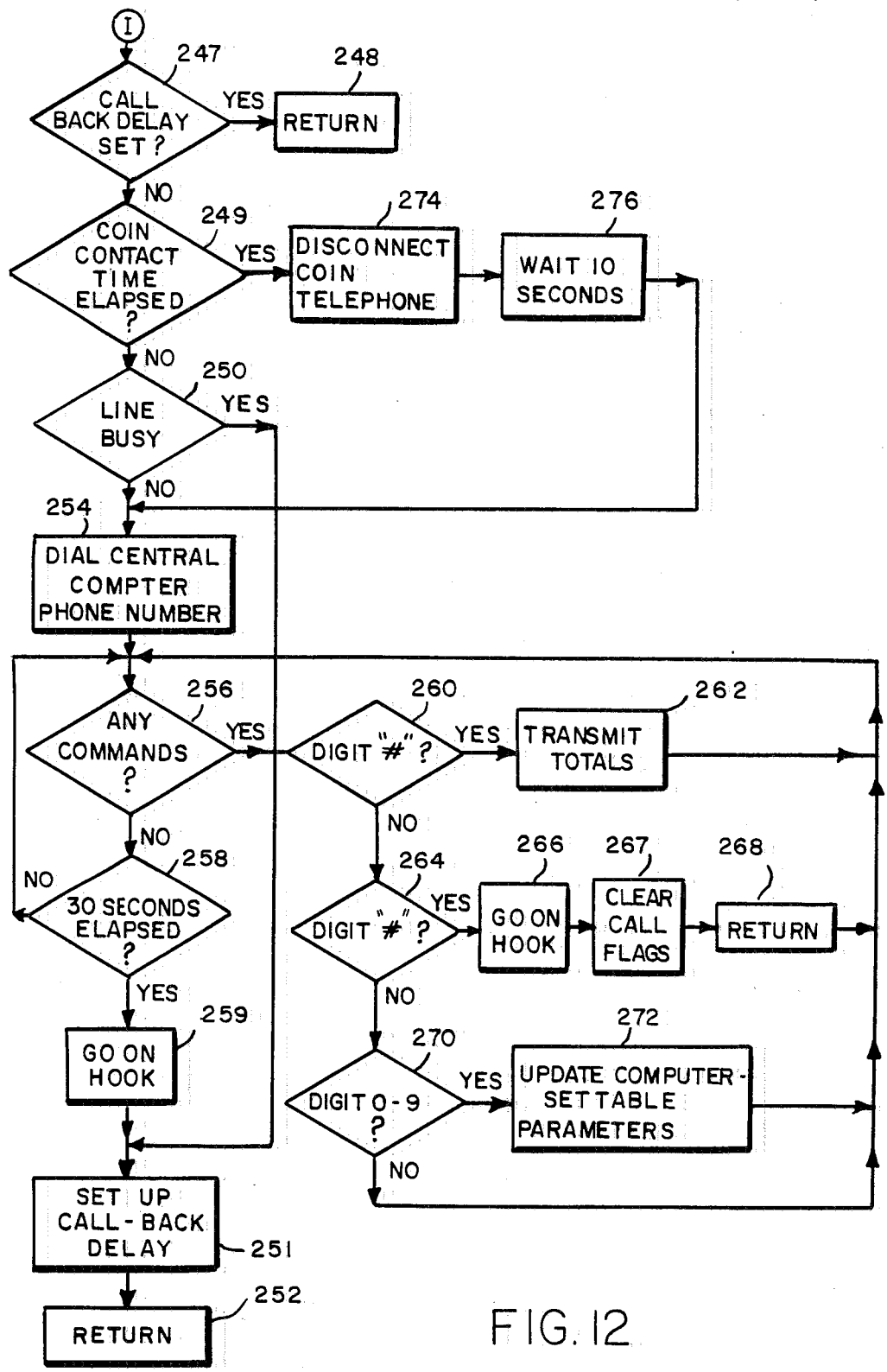

If any of the call-computer flags has been set, the result of the test represented by block 150 of FIG. 3 is affirmative, and the program branches to the subroutine depicted in FIG. 12. Upon entry of the subroutine of FIG. 12, a determination is made of whether the control circuit has already tried to place a call and is currently waiting for a delay to be completed before placing a call again. Block 247 represents this determination. If such a call-back delay is in progress, control is returned to the main loop, as block 248 indicates. Otherwise, the control circuit determines whether the reason for entry into the subroutine is that the coin contacts have been open too long, as block 249 indicates. If not, the control circuit 30 consults the output of the off-hook detector 32 to determine whether a call is already in progress, as block 250 indicates.

If a call is already in progress, the program proceeds to the step represented by block 251, in which a call-back-delay timer is set to time out after the predetermined call-back delay. Control is then returned to the main program loop, as block 252 indicates.

If the result of the test represented by block 250 is negative—that is, if the telephone is not off hook and thus not in use, the control circuit 30 closes relay contacts 20 to turn on the high-current power supply and operates the tone transmitter 68 to dial the telephone number of the central computer that collects data from coin-telephone auditors. This step is represented by block 254 of FIG. 12. The subroutine then begins a loop consisting of the two tests represented by blocks 256 and 258, in which the control circuit 30 monitors the output of the receiver 72 to determine whether the central computer has responded. This monitoring can continue for thirty seconds, as block 258 indicates, after which the subroutine escapes from the loop if the computer has not responded. It then executes the step represented by block 259, in which the control circuit 30 opens the relay contacts 20 of the high-current power supply 18. It also closes contacts 24 and 26, if they are open, to allow a customer to use the coin telephone. In other words, the auditor system 10 "hangs up." The subroutine of FIG. 12 then proceeds to the step represented by block 251 to start the call-back delay, after which a call will again be attempted. As before, control then returns to the main loop depicted in FIG. 3.

On the other hand, if the result of the test represented by block 256 is positive—that is, if the central computer has sent a command—then the subroutine of FIG. 12 proceeds to determine what the command is. It first determines whether the command is the pair of simultaneous tones represented on a dial by a pound (#) sign. This test is represented in FIG. 12 by block 260. The pound-sign signal is a request from the central computer that the auditor transmit the contents of various registers in the control circuit 30. The contents of these registers indicate to the central computer the purpose of the call and contain the information that is the object of the transmission. This transmission is represented in FIG. 12 by block 262.

After the transmission represented by block 262 is completed, the subroutine of FIG. 12 looks for further commands from the central computer. That is, it initially repeats the test represented by block 256 and continues in the loop consisting of that test and the test of block 258 until a command is received or thirty seconds have elapsed. If the computer again sends a pound sign, it is indicating that some information was lost in the transmission and that the transmission should be repeated. Otherwise, the subroutine proceeds to the test represented by block 264, in which the control circuit determines whether the transmitted signal consists of the two tones represented on a dial by an asterisk (*). Such a signal is an indication by the central computer that the communication has come to an end, and the control circuit 30 accordingly goes on hook by opening contacts 20 and by closing contacts 24 and 26 of FIG. 1 if they are open. This step is represented by block 266 of FIG. 12. The control circuit then clears the call flags, as block 267 indicates, and control is returned to the main program loop, as block 268 indicates.

If the result of the test represented by block 264 is negative—that is, if neither a pound sign nor an asterisk has been transmitted—then a test represented by block 270 is performed. This test determines whether the required signals represent one of the other ten digits 0–9. If the signals do represent one of these digits, the control circuit 30 interprets the received signals as directions to set one of several resettable parameters stored in the control circuit. In different embodiments of the present invention, different parameters can be resettable. In most instances, the real-time clock will be resettable so that drift in the time of day at which collection requests are sent can be prevented. Other parameters may also be set, such as the maximum switch-open times for the coin and receptacle switches and the number of days of advance notice to be provided in collection requests. Block 272 represents this step of setting new parameters.

After a new parameter is set, the subroutine returns to determine whether the central computer is sending any new signals. If the next signal consists of the tones represented on the dial by an asterisk, the conclusion is drawn that communication has been completed, and the control circuit 30 hangs up as before and returns to the main loop, as blocks 266 and 268 indicate.

It was mentioned above that there are occasions in which the subroutine of FIG. 12 causes relay contacts 24 and 26 to close if they have been opened. These contacts will have been opened, as block 274 indicates, if the result of the test of block 249 is positive. A positive result of this test indicates that the coin contacts are jammed and that the reason for calling the central computer is to report this fact. If the coin contacts are jammed, however, the coin telephone will have appeared off hook to the central office for an extended period of time, so the central office will have "given up" on the coin telephone—i.e., it will not respond to its dial signals until the telephone has gone on hook for a time and then gone back off hook. By opening contacts 24 and 26, the control circuit 30 makes the telephone appear on hook again, and the control circuit then waits for ten seconds, as block 276 indicates, to cause the central office again to be responsive to the coin telephone's dial signals and thus those of the auditor. With contacts 24 and 26 open, the coin telephone is disconnected from the telephone lines, so the control circuit 30 can transmit dial tones even though the coin contacts are open. After ten seconds, therefore, the subroutine proceeds to the step represented by block 254 and proceeds as before.

A summary of the foregoing flow-chart descriptions can be made by reference to FIG. 3. Inspection of FIG. 3 reveals that the main program loop consists largely of determinations of whether to respond to indications from various of its input devices. Of its nine tests, eight involve these determinations. In response to these determinations, the various registers for collecting information are updated. In a few cases, the routines for keeping the information up to date also set the call-computer flag. For instance, if the receptacle switch has been open for too long, a decision is made to call the central computer, and operation of the test switch also causes the call-computer flag to be set.

Most of the occasions for setting the call-computer flag, however, are encountered during the clock interrupt routine, which interrupts the main loop every half second to determine whether a call has been attempted but not completed, whether the coin contacts are jammed, whether the coin receptacle has been open or the telephone idle for too long, and whether the time has yet arrived to call for a collection or to make a monthly report. Any time the call-computer flag is set, the main loop branches to a subroutine for placing the call, and the control circuit places the call and transmits the contents of all the relevant registers. At such times, the central computer will typically reset the real-time clock in the control circuit 30 and may reset certain of the registers containing various operating parameters.

The circuitry of the auditor system was depicted in FIG. 1 in block-diagram form in order to avoid the unnecessary complexity of a more-detailed, schematic-diagram representation; the individual block-diagram elements can readily be embodied in conventional circuitry, and understanding of the invention would not be facilitated by increased detail in the description of most of these elements. However, it may be instructive to consider in more detail the coupler and power supplies represented in FIG. 1 by blocks 18, 22, 58, and 70. Accordingly, FIG. 13 is a schematic diagram of these particular elements.

Figure 13:
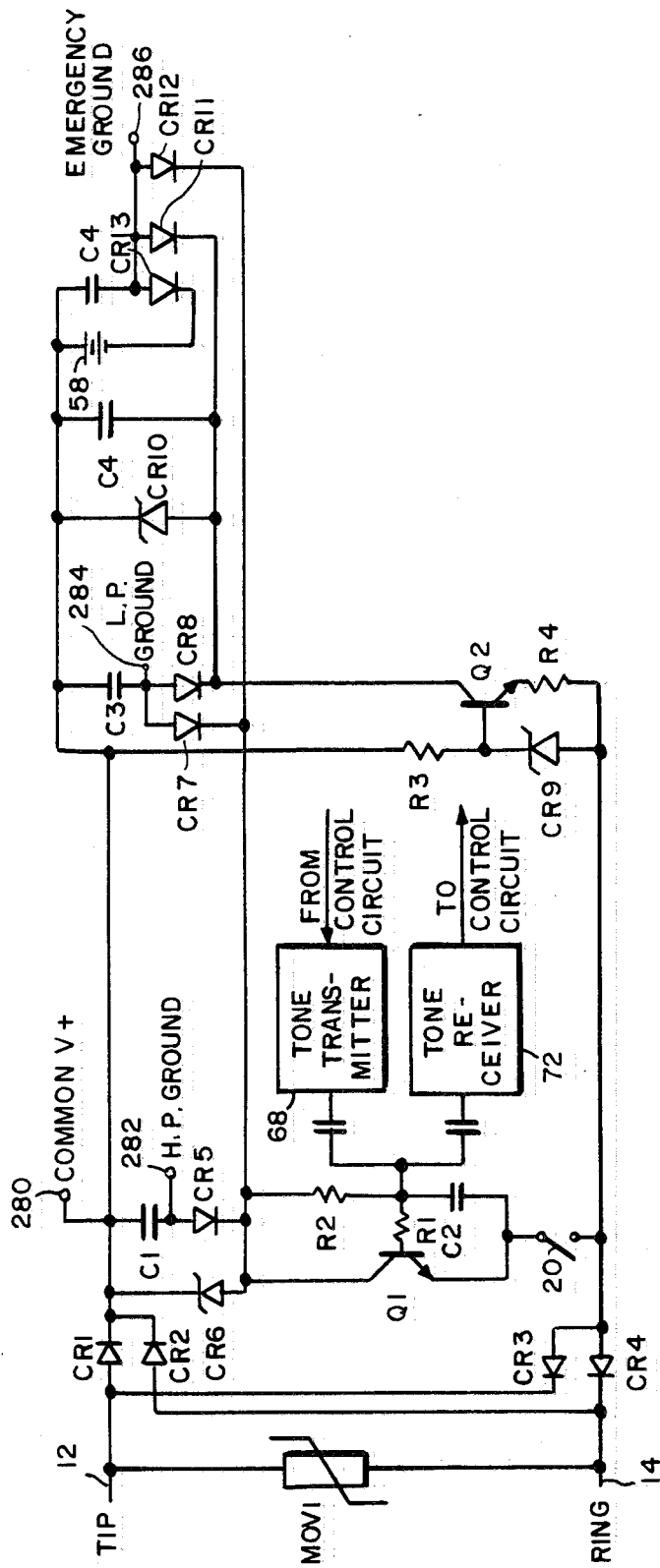
FIG. 13 is a schematic diagram of the power-supply and coupling circuitry used in the system of FIG. 1.

FIG. 13 includes the tip and ring lines 12 and 14 of FIG. 1, and the surge protector 16 of FIG. 1 is represented as a metal-oxide varistor MOV1 The tip and ring lines are connected to power-supply circuitry by means of a diode bridge consisting of diodes CR1, CR2, CR3, and CR4. The diode bridge is employed because the polarity of the potential difference between the tip and ring lines is sometimes reversed during signaling between the coin telephone and its central office.

The junction of bridge diodes CR1 and CR2 defines a node that provides the common positive supply voltage for the circuitry of FIG. 1, as a terminal 280 suggests. Terminal 280 represents a common positive-voltage output terminal for the high-current power supply 18, the low-current power supply 22, and the battery 58 of FIG. 1. A second terminal 282 of FIG. 13 represents the ground connection for the high-current power supply. This terminal 282 is connected to those elements of the circuit that need power only when a call from the auditor system 10 is in progress.

In order to operate the high-current power supply 18, the control circuit 30 closes relay contacts 20 to complete a current path that includes the zener diode CR6 and the transistor Q1. More specifically, 5.6 volts of the voltage between tip and ring appears across the zener diode CR6, and the remainder appears between the collector and emitter of Q1. Initially, capacitor C2 has no charge, so no current flows in the path consisting of base resistor R1 and the base-emitter junction of transistor Q1. As a result, a voltage appears across R2, causing current to flow through it and capacitor C2. This charges capacitor C2, and transistor Q1 is soon biased into its active region, where it reaches an equilibrium in which the voltage across capacitor C2 is just high enough to cause the base of transistor Q1 to draw enough current to prevent further charging of capacitor C2. Transistor Q1 also draws enough current to make the coin telephone appear off hook to the central office. This enables the auditor system to place a call.

Part of the current that Q1 draws flows through the zener diode CR6, and the remainder flows largely through the high-power load connected across terminals 280 and 282, returning through diode CR5. The potential difference between terminals 280 and 282 is kept constant by the action of diode CR6. Diode CR6, which is a zener diode, acts to keep a voltage of 5.6 volts across its terminals, and the 0.6 volt drop in diode CR5 reduces the voltage between terminals 280 and 282 to 5.0 volts. Capacitor C1, a relatively large capacitor, provides an AC shunt across terminals 280 and 282. Thus, the circuit of FIG. 13 acts as a constant-voltage power supply.

At the same time, it acts to couple AC signals from the tone transmitter 68 to tip and ring and from tip and ring to the tone receiver 72. This can be understood if it is appreciated that any AC voltage between tip and ring appears across R2, and R2 presents the entire AC conductance that the power-supply circuit of FIG. 13 presents to the telephone lines when contacts 20 are closed. When an AC voltage variation appears across tip and ring, there is no change in the voltage across C2, which has a large capacitance, so the potential difference between ring line 14 and the lower terminal of R2 remains constant. Similarly, there is no change in the voltage across the zener diode CR6, so the potential difference between the tip line 12 and the upper terminal of R2 remains constant. The entire voltage variation therefore appears across R2.

Since C2 has a high capacitance, the current drive to Q1 is substantially constant, so Q1, which operates in its active region, draws a constant current. Thus, an increase in the voltage from the collector to emitter of Q1 results in no change in the current drawn by that transistor. In other words, the transistor appears as an open circuit for AC signals.

With this operation in mind, it can readily be seen that AC signals received from the telephone lines cause a changing voltage between the common positive voltage terminal 280 and the lower terminal of resistor R2, and this changing voltage is readily sensed by the tone receiver 72. Similarly, the tone transmitter 68 applies AC signals on the telephone line by impresing AC voltages between the common positive-voltage terminal 280 and the lower terminal of resistor R2.

As was mentioned above, relay contacts 20 are usually open because there is no need to send or receive data. The potential difference between the common positive-voltage terminal and the high-power ground terminal 282 is usually zero as a result. Thus, no power is applied to the circuit elements that are connected to the high-power ground 282. But other elements are connected to a low-power ground terminal 284 and thus receive power even when contacts 20 are open. These elements are connected between the common positive-voltage terminal 280 and the low-power ground 284, and a shunt capacitor C3 acts as a filter for the low-power components, just as capacitor C1 does for the high-power components.

When relay contacts 20 are closed, current-sink transistor Q1 draws current from the low-power load components through a diode CR7 just as it draws current through the high-power components through diode CR5. When relay contacts 20 are open, Q1 is turned off, a further transistor Q2 draws current through the low-power load through a diode CR8, and diode CR7 is back biased to isolate the high-power load from Q2.

Transistor Q2 is biased by a bias circuit that includes resistors R3 and R4 and zener diode CR9. Diode CR9 is a 2.5 volt zener, and the remainder of the voltage between the tip and ring lines 12 and 14 is dropped across resistor R3. Zener diode CR9 sets a constant voltage across the series combination of resistor R4 and the base-emitter function of Q2, so Q2 draws a constant current regardless of the voltage across tip and ring. Transistor Q2 draws this constant current through a parallel circuit that includes the low-power load and a diode CR8 in one branch and includes a further zener diode CR10 in another branch. Diode CR10 is a 5.6 volt zener, which cooperates with diode CR8 to set a constant voltage between the common positive-voltage terminal 280 and the low-power ground terminal 284.

The use of a constant-current sink in series with the parallel combination of zener diode and load is necessary in order to power the load adequately without affecting the normal operation of the coin telephone both when the tip-to-ring voltage is at its off-hook value of 10 volts and when it is at its on-hook value of 48 volts. If, instead of a current sink, the circuit used a simple resistor with a resistance low enough to permit the requisite current to flow through the load when the coin telephone is off hook, too much current would be drawn when the telephone is on hook, and the central office would erroneously sense an off-hook condition. The use of a constant-current sink avoids this problem.

A capacitor C4 with a very high capacitance is wired in parallel with zener diode CR10 and provides energy storage so that, when the telephone-line power is interrupted during coin-telephone signaling, the output of the low-power supply will decay slowly and apply adequate power to control circuit 30 until the telephone-line power is restored. This interruption is often up to three seconds in normal operation. If an extended power failure occurs, the charge on capacitor C4 will decay to a value below that required for proper circuit operation, but power should still be applied to certain volatile memory elements that contain important information. Accordingly, the volatile elements are connected to an emergency ground terminal 286. Only those elements that are connected to terminal 286 receive power from the long-lived battery 58.

During ordinary operation, transistor Q2 draws current by way of diode CR11 through the load connected to the emergency ground 286. During high-power operation, transistor Q1 draws current through this load by way of diode CR12. When power on the telephone lines has failed, however, neither of these transistors draws enough current adequately to supply the load connected to the emergency ground terminal 286, and the voltage at terminal 286 rises to the point at which diode CR13 becomes forward biased. The battery 58 therefore applies a voltage through diode CR13 to the circuit elements that are connected to the emergency ground terminal 286. Diodes CR11 and CR12 are back biased in this situation so that none of the power from the battery 58 is applied to elements that are not connected to the emergency ground 286.

Clearly, other methods of supplying power to the auditor system can be employed, but the power-supply and coupling circuit of FIG. 13 enables the auditor system to be powered from the telephone lines exclusively, drawing enough current for effective communication when it exchanges data with the central computer but drawing little enough current at other times that the associated telephone does not appear to be off hook and there is no interference with ordinary operation of the telephone lines.

In light of the foregoing description, it is clear that a large amount of relevant information can be transferred with a great degree of versatility without any need to modify existing equipment. Additionally, since calls are initiated by the auditor only when necessary, traffic on the telephone network is not increased excessively. The result can be a great savings of the expense associated with maintaining coin telephones and making collections from them.

I claim:

1. A coin-telephone auditor for a pay telephone that accepts coins, stores them in a coin receptacle, is connected to a telephone circuit by which it communicates with a central office that connect it to other telephone stations on a telephone circuit, and is operable by users to place calls to other telephones on the telephone circuit, the auditor comprising:
   A. a dial-and-signaling circuit connected to the telephone circuit and operable by application of control signals thereto to apply dial and data signals to the telephone circuit to cause the central office to connect the auditor to a telephone station indicated by the dial signals for transmission to that station of information represented by the data signals; and
   B. a monitor circuit for monitoring the quantity of coins in the coin receptacle of the coin telephone, determining whether the quantity of coins has reached a predetermined level by comparing to the predetermined level an index to which the relative contributions of coins of different denominations differ in accordance with their relative physical sizes, and if the quantity of coins has reached the predetermined level, operating the dial-and-signaling circuit to cause it to dial up a predetermined telephone station on the telephone circuit in response and transmit to the predetermined telephone station data signals representing the quantity of coins in the receptacle.

2. A coin-telephone auditor as defined in claim 1 wherein the monitor circuit determines the predetermined level by determining the average rate at which the quantity of coins in the coin receptacle has increased during a previous interval and calculating the level that will precede reaching a full level by an intended lead time if the qunatity of coins increases at the average rate.

3. A coin-telephone auditor as defined in claim 2 wherein the monitor circuit waits until a predetermined time of day to dial up the predetermined telephone station in response to the coin quantity's reaching the predetermined level.

4. A coin-telephone auditor as defined in claim 1 wherein the monitor circuit waits until a predetermined time of day to dial up the predetermined telephone station in response to the coin quantity's reaching the predetermined level.

5. A coin-telephone auditor for a pay telephone that accepts coins, stores them in a coin receptacle, is connected to a telephone circuit by which it communicates with a central office that connects it to other telephone stations on a telephone circuit, and is operable by users to place calls to other telephones on the telephone circuit, the auditor comprising:
   A. a dial-and-signaling circuit connected to the telephone circuit and operable by application of control signals thereto to apply dial and data signals to the telephone circuit to cause the central office to connect the auditor to a telephone station indicated by the dial signals for transmission to that station of information represented by the data signals; and
   B. a monitor circuit for monitoring the quantity of coins in the coin receptacle, determining whether the quantity of coins has reached a predetermined level determined by determining the average rate at which the quantity of coins in the coin receptacle has increased during a previous interval and calculating the level that will precede reaching a full level by an intended lead time if the quantity of coins increases at the average rate, and if the quantity of coins has reached the predetermined level, operating the dial-and-signaling circuit to cause it to dial up a predetermined telephone station on the telephone circuit in response and transmit to the predetermined telephone station data signals representing the quantity of coins in the receptacle.

6. A coin-telepohone auditor as defined in claim 5 wherein the monitor circuit waits until a predetermined time of day to dial up the predetermined telephone station in response to the coin quantity's reaching the predetermined level.

7. A coin-telephone auditor for a pay telephone that accepts coins, stores them in a coin receptacle, is connected to a telephone circuit by which it communicates with a central office that connects it to other telephone stations on a telephone circuit, and is operable by users to place calls to other telephones on the telephone circuit, the auditor comprising:

A. a dial-and-signaling circuit connected to the telephone circuit and operable by application of control signals thereto to apply dial and data signals to the telephone circuit to cause the central office to connect the auditor to a telephone station indicated by the dial signals for transmission to that station of information represented by the data signals; and B. a monitor circuit for monitoring a condition of the coin telephone and operating the dial-and-signaling circuit to cause it to dial up a predetermined telephone station on the telephone circuit and transmit to the predetermined telephone station data signals representing the monitored condition, the monitor circuit including a power supply that provides a supply voltage to the remainder of the monitor circuit, and is in turn powered by the telephone circuit, and includes:

i. a passive constant-voltage element that draws a relatively low current when the potential difference across its terminal is below a predetermined threshold voltage and, when the potential difference across its terminal reaches the threshold voltage, draws relatively higher currents to tend to maintain the potential difference across its terminals at the threshold voltage, the passive constant-voltage element being connected across the remainder of the monitor circuit to maintain the threshold voltage thereacross, one of the remainder of the passive constant-voltage element being connected to one line of the telephone circuit; and ii. a passive constant-current element that tends to maintain a constant current flowing through it when the potential difference across its terminals is above a minimum value that, when added to the threshold voltage, is less than the telephone-circuit off-hook voltage, the constant-current element being connected between the other line of the telephone circuit and the parallel combination of the constant-voltage element and the rest of the monitor circuit and drawing a low enough current to permit an on-hook voltage on the telephone circuit when the coin telephne is on hook.

* * * * *